June 20, 1950   J. W. FRENCH ET AL   2,511,975
MICROMETER EYEPIECE FOR OPTICAL
MEASURING INSTRUMENTS
Filed Dec. 18, 1946
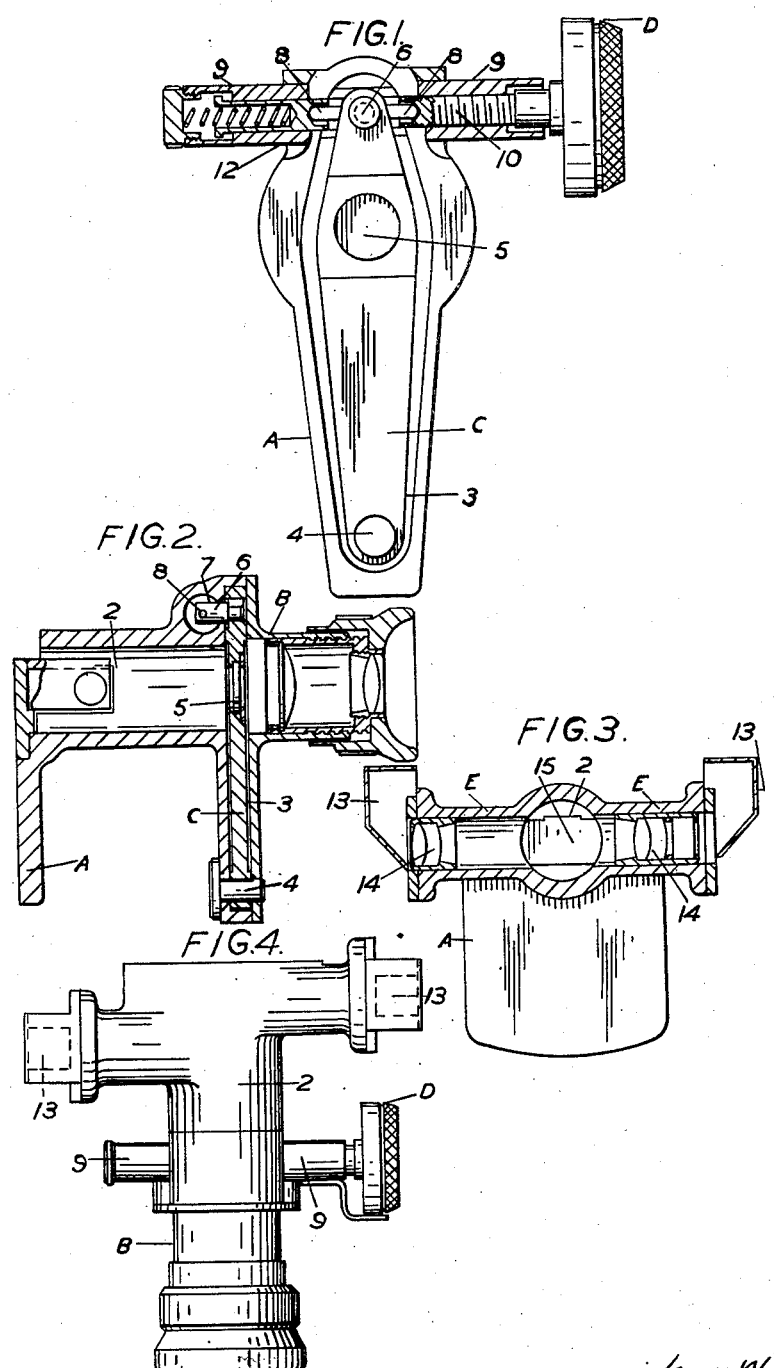
Inventors
JAMES W. FRENCH
CLAUD FOSTER
By
Attorneys Patented June 20, 1950

2,511,975

UNITED STATES PATENT OFFICE 2,511,975

MICROMETER EYEPIECE FOR OPTICAL MEASURING INSTRUMENTS

James Weir French and Claud Foster, Glasgow, Scotland, assignors to Barr & Stroud, Limited, Glasgow, Scotland Application December 18, 1946, Serial No. 716,955
In Great Britain March 18, 1939

Section 1, Public Law 690, August 8, 1946
Patent expires March 18, 1959

3 Claims. (Cl. 33—46)

This invention refers to micrometer eyepieces. Such devices are provided in various precision measuring instruments, for example, on stereo-goniometric apparatus used in connection with the examination of aerial photographs, and on theodolites. The device comprises a graticule or other mark (hereinafter referred to as a graticule) which is movable by means of a micrometer screw, and an eyepiece through which the graticule is examined.

According to the present invention a micrometer eyepiece is provided in which movement of the graticule in the field of view is a pivotal movement instead of, as hitherto, a sliding movement in guides.

The graticule mounting may comprise a single pivotal support about which a carrier for the graticule is angularly movable with the graticule spaced apart from the pivotal support.

The micrometer eyepiece in accordance with the invention may have a reflecting system whereby a scale can be viewed at two spaced positions through the eyepiece, for example, at diametrically opposite positions on a circular scale.

The invention will now be described with reference to the accompanying drawing, in which:

Figure 1 is a sectional view looking from the front.

Figure 2 is a sectional side view,

Figure 3 is a sectional view of a modification of the embodiment shown in Figures 1 and 2 looking from the front, and Figure 4 is a plan view of Figure 3.

The micrometer eyepiece comprises a bracket A, an eyepiece B mounted on the bracket A, a graticule carrier C, and a micrometer screw device D.

The bracket A has a tubular part 2 through which the scale to be read by means of the eyepiece is viewed. Within a recess 3 of the bracket A, the graticule carrier C is pivoted on a pin 4. The graticule is denoted by 5. The stud 6 extends rearwardly from the graticule carrier C into a bore 7 in the bracket A, the stud 6 being rigidly attached to the carrier C and engaging with two toggle pins 8. A cylindrical barrel 9 extends transversely on each side of the bore 7, and the micrometer screw device D has a screw threaded stem 10 passing through and in screw engagement with the right hand part of the barrel 9, Figure 1, and in the left hand part of the barrel 9 there is a spring pressed plunger 12. The right hand toggle pin 8 abuts on the stem 10 and the left hand toggle pin 8 abuts on the plunger 12. The pins 8 as shown have hemispherical ends bearing loosely in cone cups in members 10 and 12, while the pins 8 also rest at their opposite ends in sockets in stud 6. The pins are thus free to self-align in pivotal manner between 10, 6 and 12 as with a toggle mechanism.

It will thus be seen that turning of the screw device D in one direction screws the stem 10 inwards and moves the graticule carrier C and graticule 5 to the left, Figure 1, about its pivot 4 against the action of the plunger 12, while on turning the device D in the opposite direction, the plunger 12 moves the carrier C to the right.

There is also shown in the drawing, Figures 3 and 4, an optical reflecting system E, which is a modification of the embodiment shown in Figures 1 and 2, and which enables the scale to be viewed at two spaced positions, the system comprising end reflectors 13, lenses 14, and central reflectors at 15. Light from two spaced positions on the scale enters the end reflectors 13, is reflected by these reflectors inwards to the tubular part 2 of the device through the lenses 14, and then is reflected by the central reflectors at 15 forward into the eyepiece B.

We claim:

1. A micrometer eyepiece for an optical measuring instrument, including a graticule adapted to be finely adjusted in position, in a single plane, comprising an elongated graticule carrier, a graticule intermediate the ends of said carrier, pivot means towards one end of said graticule carrier for allowing said carrier to pivot in said plane; and towards the other end of said graticule carrier and to one side of the carrier micrometer screw means for displacing the carrier in said plane, and resilient means urging the carrier towards said micrometer screw means.

2. A micrometer eyepiece for an optical measuring instrument, including a graticule adapted to be finely adjusted in position, in a single plane, comprising an elongated graticule carrier, a graticule intermediate the ends of said carrier, pivot means towards one end of said graticule carrier for allowing said carrier to pivot in said plane; and towards the other end of said graticule carrier and to one side of the carrier micrometer screw means for displacing the carrier in said plane, resilient means urging the carrier towards said micrometer screw means, and pivot means between said micrometer screw means and said carrier and pivot means between said resilient means and said carrier.

3. A micrometer eyepiece for an optical measuring instrument, including a graticule adapted to be finely adjusted in position, comprising a graticule carrier, a graticule intermediate the ends of said carrier, pivot means at a location towards one end of said carrier; a projection at a location towards the other end of said carrier projecting parallel to the axis of said pivot means, a pivotal member laterally at each side of said projection, micrometer screw means acting on one of said members for pivoting the carrier and resilient means acting on the other of said members in a direction towards said screw means.

JAMES WEIR FRENCH.
CLAUD FOSTER.

REFERENCES CITED

The following references are of record in the file of this patent:

UNITED STATES PATENTS

| Number | Name | Date |
|---|---|---|
| 811,777 | Konig | Feb. 6, 1906 |
| 1,106,956 | Meyer | Aug. 11, 1914 |
| 1,263,353 | Baalsrod | Apr. 16, 1918 |
| 1,761,260 | Gallasch | June 3, 1930 |
| 2,180,184 | Weaver | Nov. 14, 1939 |